US011507306B2

(12) United States Patent
Akamatsu

(10) Patent No.: US 11,507,306 B2
(45) Date of Patent: Nov. 22, 2022

(54) RECORDING APPARATUS THAT RECORDS DATA USING FILE SYSTEM, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Ryo Akamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 482 days.

(21) Appl. No.: 16/672,617

(22) Filed: Nov. 4, 2019

(65) Prior Publication Data
US 2020/0150902 A1 May 14, 2020

(30) Foreign Application Priority Data

Nov. 8, 2018 (JP) .............................. JP2018-210647

(51) Int. Cl.
*G06F 3/06* (2006.01)
(52) U.S. Cl.
CPC .......... *G06F 3/0659* (2013.01); *G06F 3/0604* (2013.01); *G06F 3/0643* (2013.01); *G06F 3/0655* (2013.01); *G06F 3/0673* (2013.01)
(58) Field of Classification Search
CPC .... G06F 3/0604; G06F 3/0643; G06F 3/0655; G06F 3/0673
See application file for complete search history.

(56) References Cited

U.S. PATENT DOCUMENTS

| 2006/0004969 | A1 | 1/2006 | Suda | |
|---|---|---|---|---|
| 2008/0005111 | A1* | 1/2008 | Savage | G06F 11/1474 |
| 2011/0022645 | A1* | 1/2011 | Maeda | G06F 16/13 |
| | | | | 707/822 |
| 2019/0079859 | A1* | 3/2019 | Li | G11C 16/349 |

FOREIGN PATENT DOCUMENTS

| JP | 2006018471 A | 1/2006 |
|---|---|---|
| JP | 2016015057 A | 1/2016 |

* cited by examiner

*Primary Examiner* — Edward J Dudek, Jr.
(74) *Attorney, Agent, or Firm* — Rossi, Kimms & McDowell LLP

(57) ABSTRACT

A recording apparatus that is capable of preventing degradation of a writing speed of management information under recording without increasing the recording preparation time when a plurality of files are recorded simultaneously. The recording apparatus includes a memory and a processor that function as a recording unit that records a file in a recording medium, and a controller that controls so as to record a directory entry of a file in a designated sector in the recording medium. The recording medium consists of blocks each of which includes a plurality of pages, allows to write data in a page unit, allows to erase data in a block unit, and allows to access a page corresponding to a sector designated by a sector number. When a plurality of files will be recorded, the controller controls so that directory entries of the plurality of files will be recorded in a same sector.

11 Claims, 10 Drawing Sheets

RECORDING APPARATUS THAT RECORDS DATA USING FILE SYSTEM, CONTROL METHOD THEREFOR, AND STORAGE MEDIUM STORING CONTROL PROGRAM THEREFOR

BACKGROUND OF THE INVENTION

Field of the Invention

The present invention relates to a recording apparatus that records data using a file system, a control method therefor, and a storage medium storing a control program therefor.

Description of the Related Art

In recent years, a detachable small recording medium, such as an SD card, is used for a recording medium of incorporated appliances, such as a digital camera, in many cases. A FAT (File Allocation Table) file system is used for a format of a file system of a small recording medium, in many cases.

The FAT file system is roughly classified into a system information area and a data storage area. The data storage area consists of units called clusters. Files holding actual data, such as a moving image and a static image, and a directory for managing metadata are recorded in the data storage area. Moreover, an area in which metadata managed by a directory is recorded is called a directory entry. Directories include a subdirectory that manages metadata of a file and a root directory that manages metadata of a subdirectory. That is, a directory entry is provided for every file and subdirectory.

A name, an attribute, a time stamp, and a start cluster number of a file or subdirectory are recorded in a directory entry. The system information area consists of an area in which information about a recording medium itself is recorded, FAT that manages a status (used or unused) and a connection state of each cluster. In the FAT file system, a file and a directory in the data storage area are managed by a cluster unit. That is, each of a file and directory in the data storage area consists of at least one cluster.

Management information about the FAT file systems, such as FAT and a directory, is updated whenever actual data is written in the small recording medium. Accordingly, although the amount of information required for updating the management information is less than the amount of information written as the live data, an update frequency of the management information is more than a writing frequency of the live data.

In the meantime, an SD card generally employs a NAND flash memory. A minimum unit that is rewritable by one write request in the NAND flash memory is called a page. When a written page is overwritten, it is necessary to erase data. A minimum unit that is erasable by one erasing request is called a block, which is larger than the page. Accordingly, when management information, such as a directory entry in a FAT file system, is updated in the NAND flash memory, a reading action by a block unit, a change action for contents in one page, an erasing action by the block unit, and a rewriting action by the block unit are needed. Accordingly, when actual data like moving image data is written in a flash memory by the block unit, an update speed of the management information becomes lower than a writing speed of the actual data.

Furthermore, enlargement of a block size due to increase in capacity of a flash memory in recent years tends to lower a speed of an action associated with change in contents by a unit smaller than the block, such as an update speed of management information.

Such degradation of the update speed of management information becomes especially a problem in a case where data should be written continuously, such as a case of recording stream data. It is because the continuous recording becomes impossible when an average writing speed to a recording medium is less than a bit rate of stream data.

In consideration of such a problem, a storage unit disclosed in Japanese Laid-Open Patent Publication (Kokai) No. 2006-018471 (JP 2006-018471A) detects a write start address and a data size from a write command of data to a recording medium and detects whether data was written in the write start address in the past. After that, when determining that the current write command is for updating a directory entry on the basis of these detection results, a storage control section writes data to the page including the detected address under control that is different from the above-mentioned control for updating the management information. Accordingly, high-speed data write is achieved.

However, even if the data write method disclosed in the above-mentioned publication is used, a problem occurs when a plurality of stream data are recorded simultaneously. Since directory entries of the plurality of stream data are not necessarily written in the same page, the storage control section cannot determine whether the write command is for updating a directory entry on the basis of the detection results even if the above-mentioned results are detected.

In consideration of such a problem, Japanese Laid-Open Patent Publication (Kokai) No. 2016-015057 (JP 2016-015057A) discloses a method of creating a new directory before recording a plurality of stream data so as to store all directory entries of the stream data in the created directory. Thereby, the directory entries of the plurality of stream data can be stored in the same page.

However, the method disclosed in JP 2016-015057A has to create a new directory whenever a plurality of stream data are recorded. Since a newly created directory needs to be filled by "0" except a reservation entry, it is necessary to write data of at least one cluster filled by "0" into a recording medium when a directory is created. Furthermore, since a cluster size of a flash memory in recent years increases, a time required for creating a new directory also increases.

As a result, the method disclosed in JP 2016-015057A results in a problem of increasing a recording preparation time for recording of stream data.

SUMMARY OF THE INVENTION

The present invention provides a recording apparatus, a control method therefor, and a storage medium storing a control program therefor, which are capable of preventing degradation of a writing speed of management information under recording without increasing the recording preparation time when a plurality of files are recorded simultaneously.

Accordingly, a first aspect of the present invention provides a recording apparatus including at least one memory and at least one processor that function as a recording unit configured to record a file in a recording medium, and a controller configured to control so as to record a directory entry of a file in a designated sector in the recording medium. The recording medium consists of blocks each of which includes a plurality of pages, allows to write data in a page unit, allows to erase data in a block unit, and allows to access a page corresponding to a sector designated by a sector number. When a plurality of files will be recorded, the controller controls so that directory entries of the plurality of files will be recorded in a same sector.

Accordingly, a second aspect of the present invention provides a control method for a recording apparatus including a memory storing a program and a processor executing the program to perform the control method, the control method including a recording step of recording a file in a recording medium, and a control step of controlling so as to record a directory entry of a file in a designated sector in the recording medium. The recording medium consists of blocks each of which includes a plurality of pages, allows to write data in a page unit, allows to erase data in a block unit, and allows to access a page corresponding to a sector designated by a sector number. When a plurality of files will be recorded, it is controlled so that directory entries of the plurality of files will be recorded in a same sector in the control step.

Accordingly, a third aspect of the present invention provides a non-transitory computer-readable storage medium storing a control program causing a computer to execute the control method of the second aspect.

According to the present invention, degradation of a writing speed of management information under recording is prevented without increasing the recording preparation time when a plurality of files are recorded simultaneously.

Further features of the present invention will become apparent from the following description of exemplary embodiments with reference to the attached drawings.

DESCRIPTION OF THE EMBODIMENTS

Figure 1:
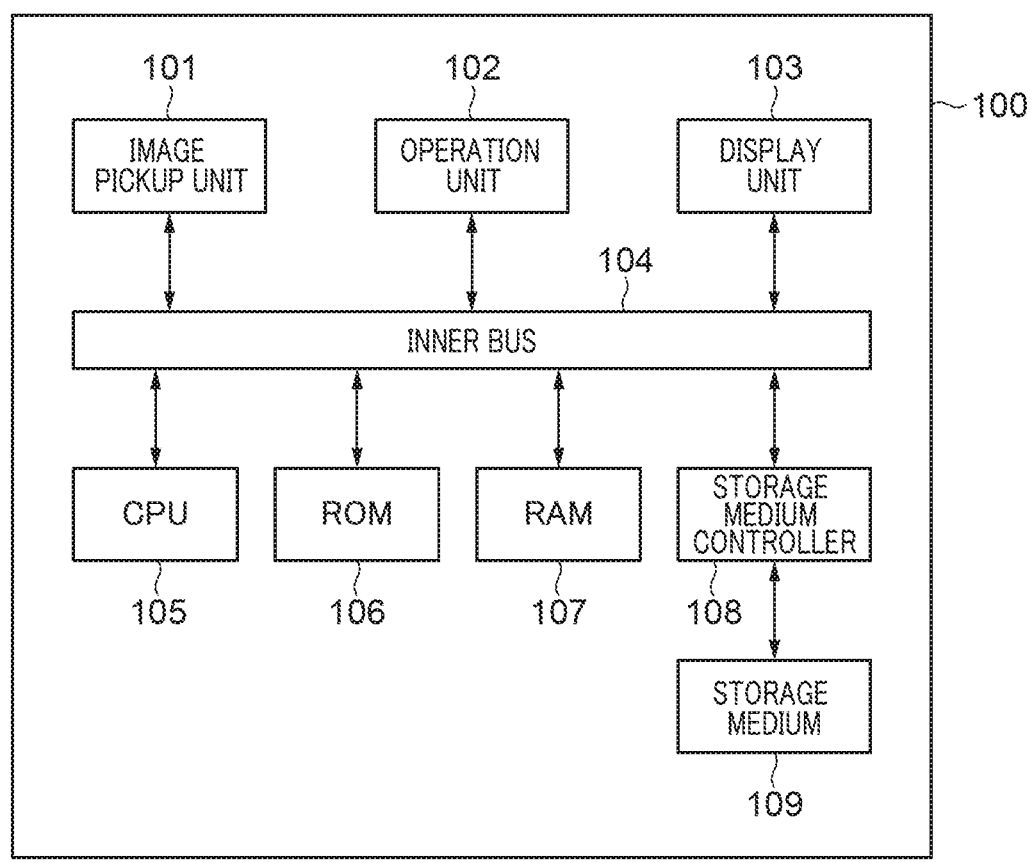
FIG. 1 is a block diagram schematically showing an internal hardware configuration of a digital camera including a storage medium controller as a recording apparatus concerning a first embodiment of the present invention.

Hereafter, embodiments according to the present invention will be described in detail by referring to the drawings.

A digital camera 100 including a storage medium controller as a recording apparatus concerning a first embodiment of the present invention will be described by referring to FIG. 1 through FIG. 9. The digital camera 100 is able to record captured moving image data into a recording medium 109.

FIG. 1 is a block diagram schematically showing an internal hardware configuration of the digital camera 100 concerning the first embodiment.

The digital camera 100 consists of an image pickup unit 101, an operation unit 102, a display unit 103, a CPU 105, a ROM 106, a RAM 107, and a storage medium controller 108. These units are mutually connected via an internal bus 104 as shown in FIG. 1.

The CPU 105 runs programs stored in the ROM 106 or the RAM 107 to control various behaviors of the digital camera 100.

The ROM 106 is a nonvolatile memory that beforehand stores a program for controlling the digital camera 100 and a program of a FAT (File Allocation Table) file system for managing data in the recording medium 109.

The RAM 107 is a temporal storage area for programs and data that are supplied from the ROM 106 and so on. Moreover, the RAM 107 is used as a buffering area for operating data recorded in the recording medium 109 from the CPU 105.

The storage medium controller 108 is physically and electrically connected with the recording medium 109 and controls reading and writing of data, such as digital image data and its management data, of the recording medium 109. The configuration of the recording medium 109 is not limited as long as the storage medium controller 108 can control reading and writing of data. For example, the recording medium 109 may be a removable medium like an SD card that is detachable from the digital camera 100 or may be a fixed medium like an E-MMC that is fixed to the digital camera 100.

The CPU 105 manages data in the recording medium 109 through the storage medium controller 108 by running the program of the FAT file system stored in the ROM 106. A sector that is a minimum access unit of the FAT file system corresponds to a page that is a minimum unit that is rewritable by one write request to the recording medium 109. Unique sector numbers from "No. 0" are assigned to sectors over the entire recording medium 109. The CPU 105 is allowed to access a specific page of the recording medium 109 by designating a sector number to the storage medium controller 108. Thereby, the CPU 105 is able to write (record) data in a page unit. In the meantime, the CPU 105 erases data in the recording medium 109 in a block unit including a plurality of pages.

The CPU 105 determines whether all directory entries of a plurality of files that will be recorded simultaneously are recordable in a page specified by the same sector number of the same directory (referred to as "the same sector") in order to manage the recording medium 109. As a result of the determination, when only a part of the directory entries of the files that will be recorded simultaneously is recordable in the same sector of the same directory, the directory entries of the files that will be recorded are recorded in a new different sector in the same directory. Accordingly, the CPU 105 converts a non-recording area in the new sector of the directory into a directory entry of a reusable type.

Figure 2:
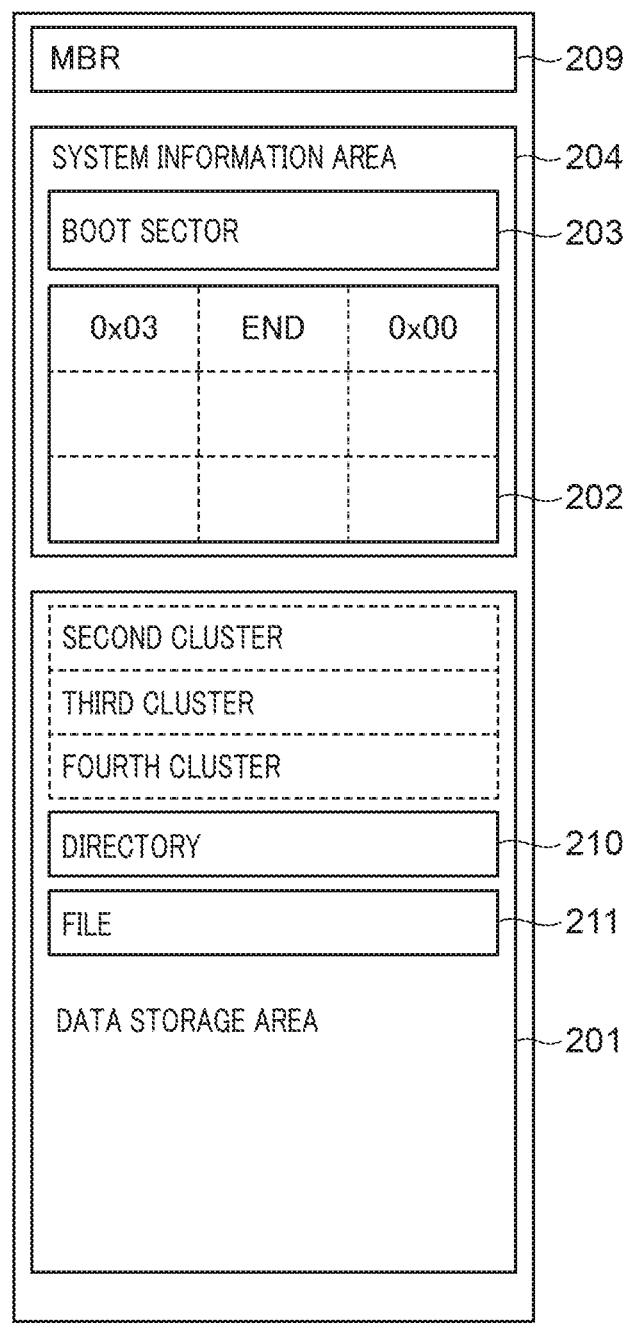
FIG. 2 is a view showing an example of data arrangement of a recording medium in FIG. 1 that is managed with a FAT file system.

FIG. 2 is a view showing an example of data arrangement of the recording medium 109 in FIG. 1 that is managed with the FAT file system. The FAT file system consists of a system information area 204 including a boot sector 203 and a FAT 202, and a data storage area 201 managed by a cluster unit. A management serial number (cluster number) decided uniquely is allocated to each cluster that constitutes the data storage area 201. A cluster number starting from "2" is allocated to each cluster in order, and a FAT entry corresponding to the allocated cluster number is saved in the FAT 202.

A directory 210 that records a file 211 of actual data like moving image data and metadata of the file 211 is recorded in the data storage area 201. Both of the directory 210 and the file 211 can be constituted by connecting a plurality of clusters. In such a case, a connection state of the clusters is indicated using the FAT 202. Specifically, a FAT entry corresponding to a cluster number allocated to a head cluster of the connected clusters records a cluster number allocated to the following cluster. Similarly, a FAT entry corresponding to a cluster number allocated to a cluster of the connected clusters other than a terminal cluster also records a cluster number allocated to a cluster following the cluster concerned. In the meantime, a value indicating the terminal cluster is recorded in the FAT entry corresponding to the cluster number allocated to the terminal cluster of the connected clusters.

When effective data is not recorded in a cluster, "0" is recorded in the FAT entry corresponding to the cluster. Accordingly, when a new data or a new directory is recorded, a cluster (vacant cluster) that "0" is recorded in the corresponding FAT entry is retrieved, and the retrieved cluster is used.

Figure 3:
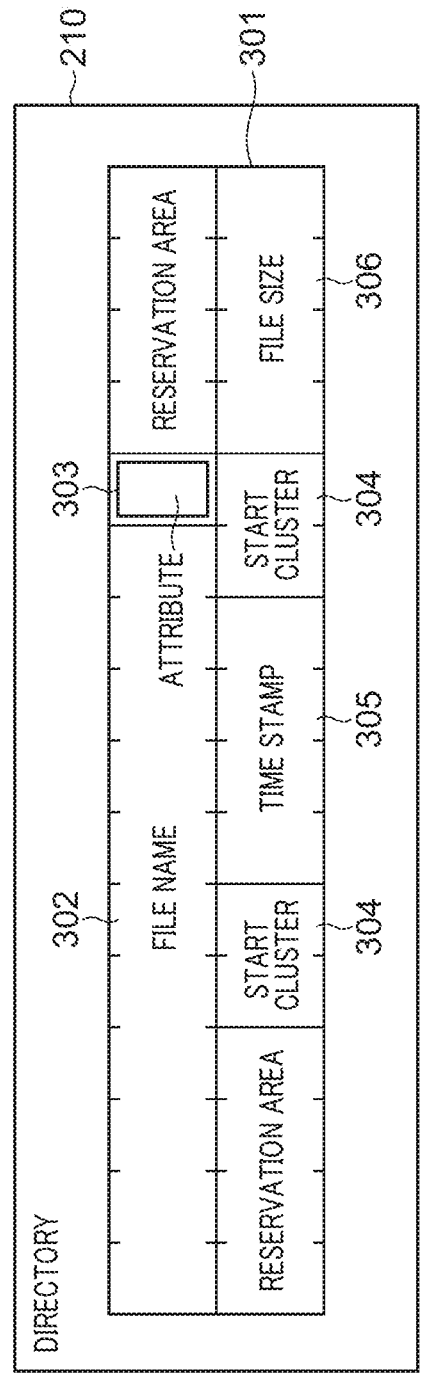
FIG. 3 is a schematic view showing a configuration of a directory entry recorded in a directory in FIG. 2.

FIG. 3 is a schematic view showing a configuration of a directory entry recorded in the directory 210 in FIG. 2.

A plurality of directory entries, which are areas recording metadata of the file 211 and another directory (not shown in FIG. 2) that exist in the recording medium 109, are recorded in the directory 210. Each directory entry corresponds to a file or a directory.

Hereinafter, a configuration of a directory entry recorded in the directory 210 will be described. A directory entry 301 in which the metadata of the file 211 is recorded is taken up as an example from among a plurality of directory entries recorded in the directory 210.

A file name 302, an attribute 303, a last change time (time stamp) 305, a start cluster number 304, and a file size 306 are recorded in the directory entry 301. In the FAT file system, one directory entry consists of at least 32 bytes.

Figure 4:
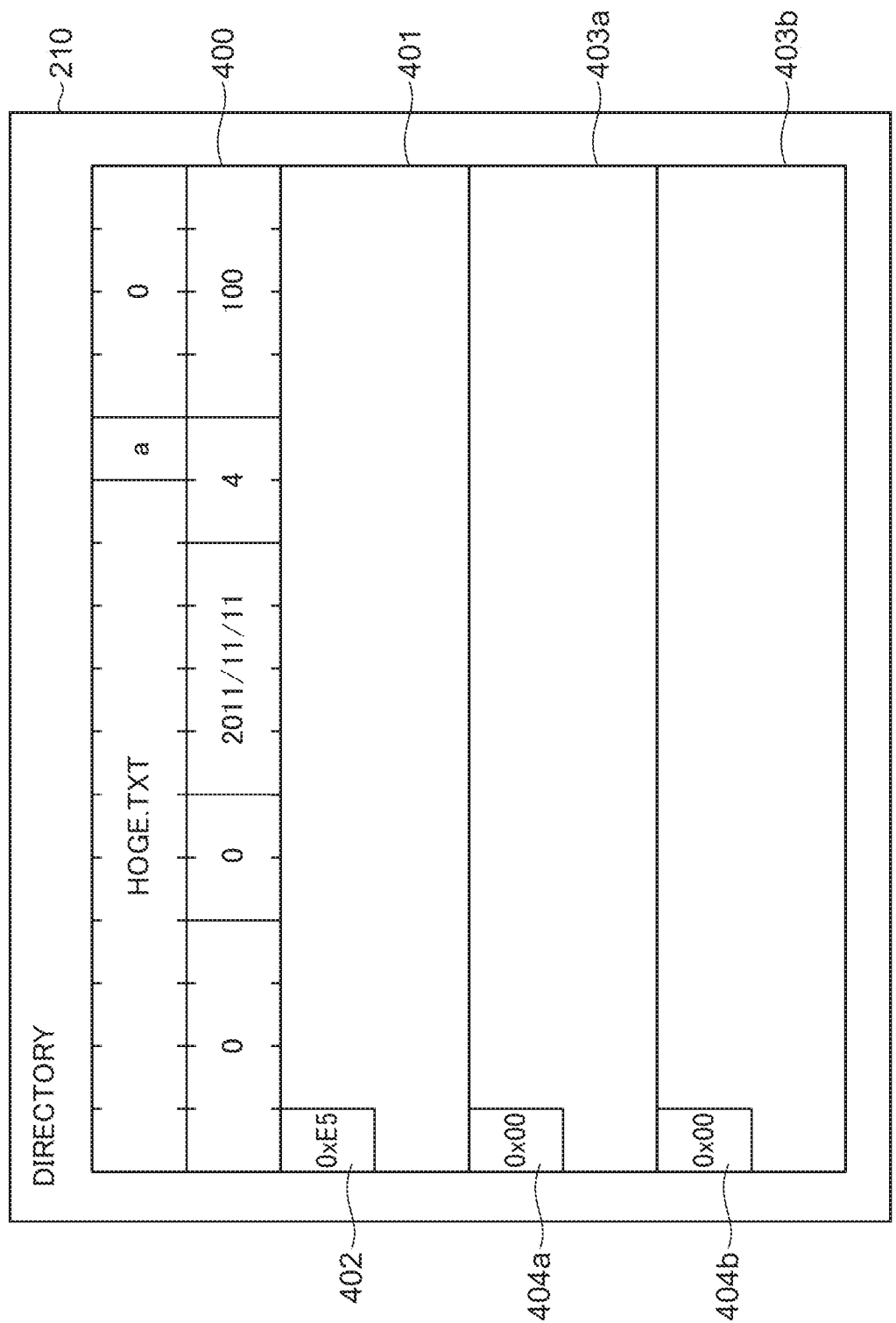
FIG. 4 is a view describing a type of each directory entry recorded in the directory in FIG. 2.

FIG. 4 is a view describing a type of each directory entry recorded in the directory 210 in FIG. 2.

There are some types of directory entries recordable in the directory 210 according to contents recorded besides the directory entry 301 exemplified in FIG. 3. Specifically, there are three types of directory entries that are a valid entry, a deleted entry, and a vacant entry.

A directory entry 401 in FIG. 4 of which head 402 is "0xE5" is a deleted entry that is invalid. A deleted entry is created by recording "0xE5" on a head of a directory entry. Values in other areas are not problems.

A directory entry 403a in FIG. 4 of which head 404a is "0x00" is a vacant entry that is an unused and invalid directory entry that has not been used once.

A valid entry 400 other than the deleted entry and the vacant entry records metadata of a file and directory that exist in the recording medium 109 as with the directory entry 301 in FIG. 3. Metadata is recordable to a directory entry that is obtained by converting a deleted entry or a vacant entry into a valid entry. Moreover, a directory is configured so that no valid entry will exist after a vacant entry. That is, when there are the plurality of directory entries 403a and 403b as shown in FIG. 4, metadata is recorded from the directory entry 403a.

Figure 5:
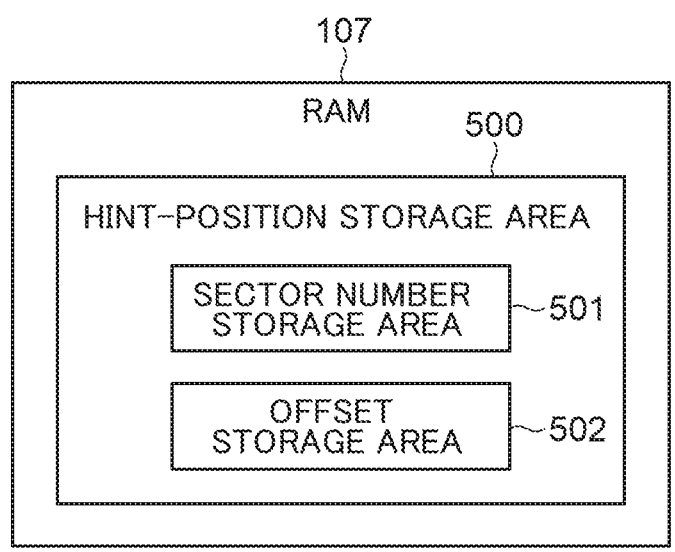
FIG. 5 is a block diagram showing a hint-position storage area used when a valid entry in FIG. 4 is newly created.

FIG. 5 is a block diagram showing a hint-position storage area used when a valid entry 400 in FIG. 4 is newly created.

The hint-position storage area 500 stores a hint position that is used when retrieval of a directory entry in which metadata is recordable is started in the below-mentioned directory-entry creating process.

The hint-position storage area 500 is secured in the RAM 107 and is operated and referred by the CPU 105. The hint-position storage area 500 is secured for each of directories including the directory 210 in the data storage area 201, and consists of a sector number storage area 501 and an offset storage area 502.

The sector number storage area 501 stores a sector number from which the retrieval of a recordable directory entry is started.

The offset storage area 502 stores a hint position that is an offset from the head of the sector from which the retrieval of a recordable directory entry is started in a byte unit.

When the value of the sector number storage area 501 is "0", the hint position information is invalid. When the hint position information is invalid, the retrieval of a recordable directory entry is started from the head sector of the directory. When the value of the sector number storage area 501 is not "0", i.e., when the hint position information is valid, the retrieval of a recordable directory entry is started from the hint position stored in the sector number storage area 501.

When recording the file 211 in the recording medium 109, the CPU 105 determines whether a new sector is used by executing the below-mentioned same-sector-recording determination process before creating the directory entry 301 that records the metadata of the file 211.

The same-sector-recording determination process will be described using a flowchart in FIG. 6.

The CPU 105 determines whether two or more files will be recorded in the recording medium 109 simultaneously in step S601. When it is determined that one file will be recorded in the step S601, the process proceeds to step S606. When it is determined that two or more files will be recorded simultaneously in the step S601, the process proceeds to step S602.

The CPU 105 determines whether all the directory entries of the files that will be recorded simultaneously are recordable in the same directory (hereinafter referred to as the directory 210) in the step S602. When it is determined that at least one directory entry of the directory entries of the files that will be recorded simultaneously is recorded in a directory that is different from the directory 210 in the step S602, the process proceeds to the step S606. When it is determined that all the directory entries of the file simultaneously recorded at step S602 were recorded in the same directory 210, the process proceeds to the step S603.

Figure 8:
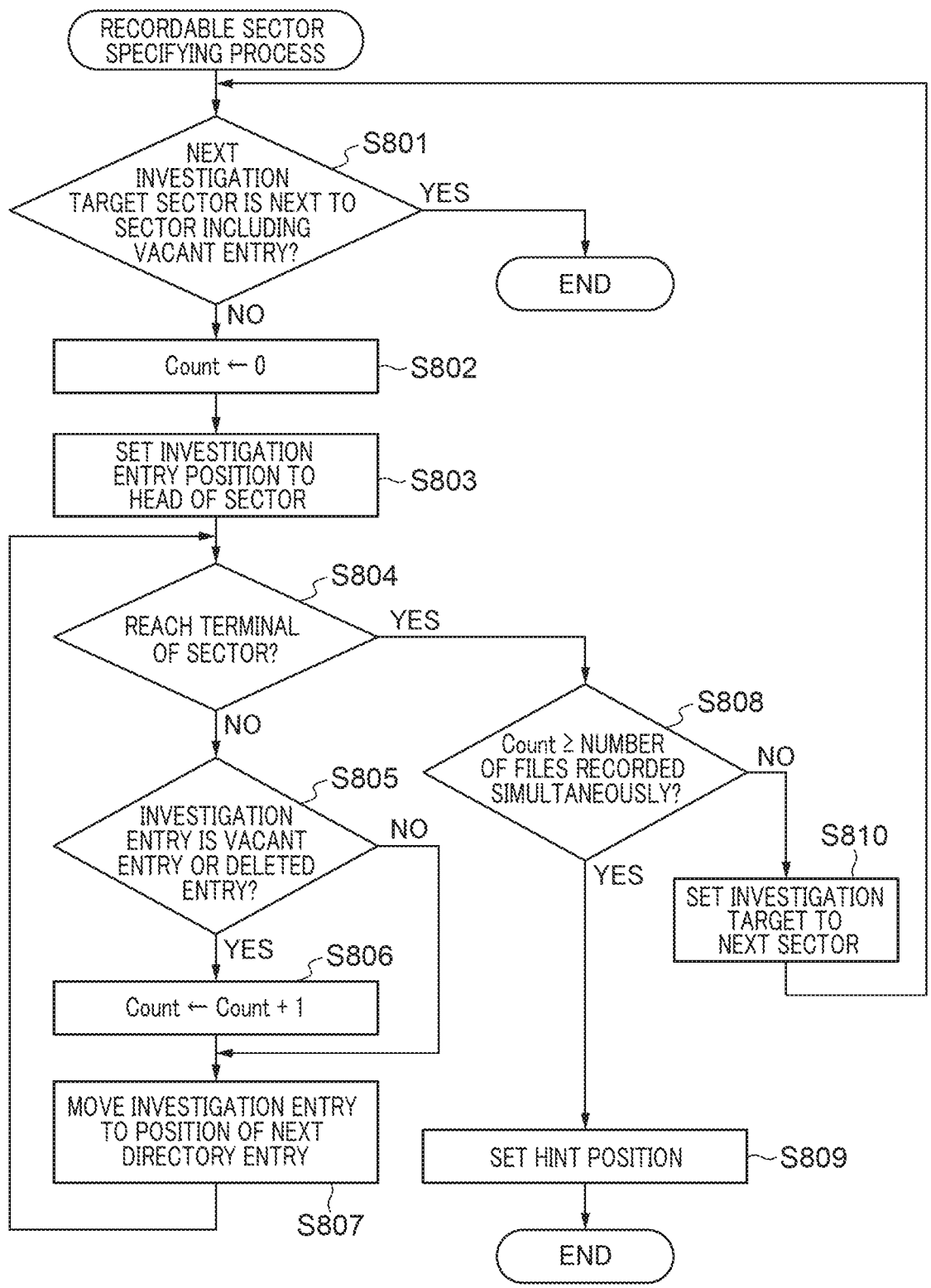
FIG. 8 is a flowchart showing procedures of a recordable sector specifying process in step S603 in FIG. 6.

The CPU 105 executes a recordable sector specifying process that will be mentioned using FIG. 8 in the step S603 to specify a sector in which all the directory entries of the files that will be recorded simultaneously can be recorded from among the recorded sectors in the directory 210.

The CPU 105 determines whether the sector has been specified by the recordable sector specifying process in step S604. That is, the CPU 105 determines whether all the directory entries of the files that will be recorded simultaneously are recordable in the same sector. When it is determined that the sector has been specified in the step S604, the process proceeds to the step S606. When it is determined that a sector cannot be specified in the step S604, the process proceeds to step S605.

Figure 9:
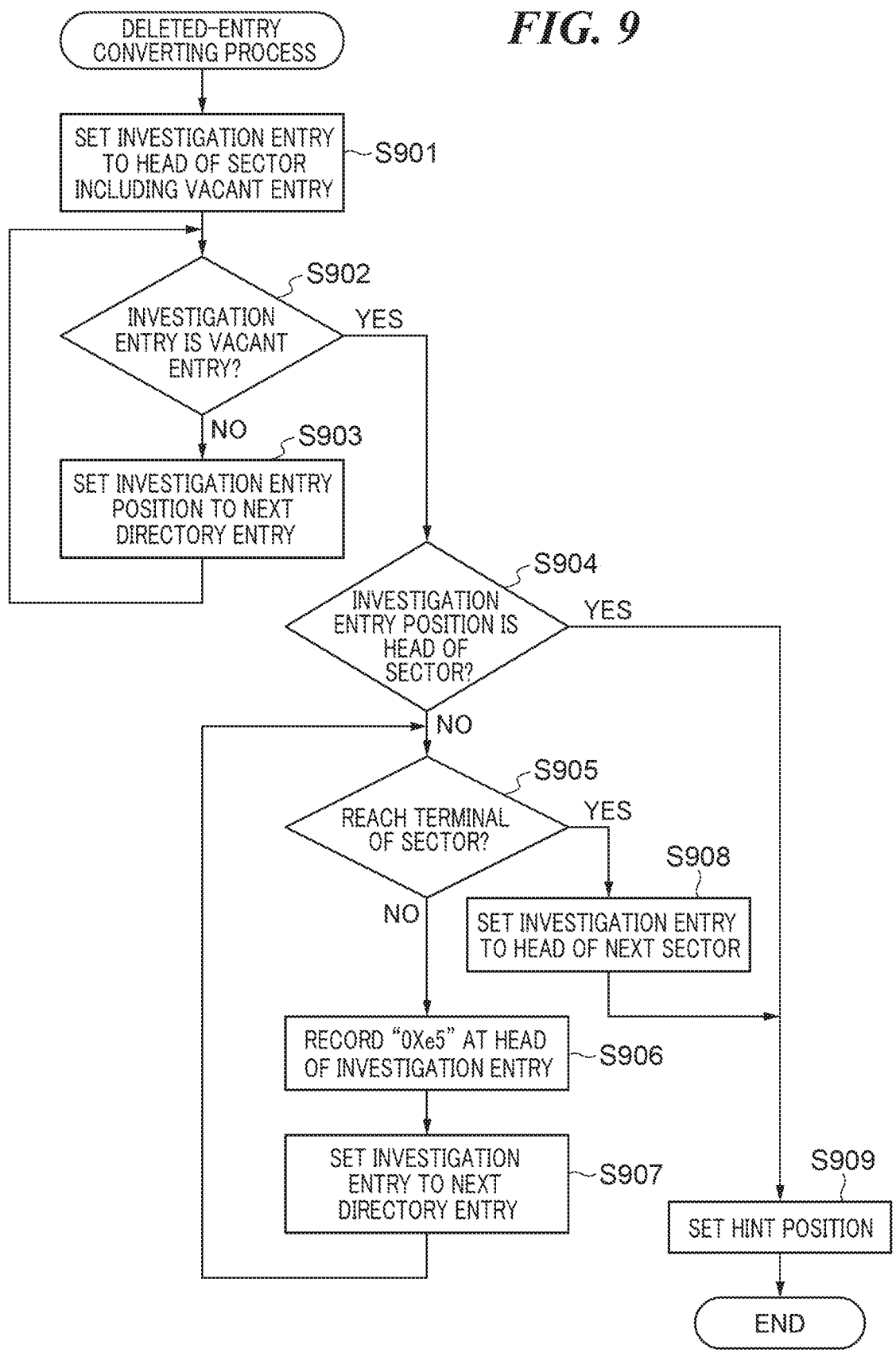
FIG. 9 is a flowchart showing procedures of a deleted entry converting process in step S605 in FIG. 6.

The CPU 105 executes a deleted-entry converting process that will be mentioned using FIG. 9 in the step S605 to create a sector in which all the directory entries of the files that will be recorded simultaneously are recordable. Then, the process proceeds to the step S606.

The CPU 105 determines whether the directory entries of all the files have been created in the step S606. When it is determined that the directory entries of all the files have been created in the step S606, this process is finished. When it is determined that there is at least one file of which directory entry is not created in the step S606, the process proceeds to step S607.

The CPU 105 creates a directory entry of a file by a directory-entry creating process that will be mentioned later using FIG. 7 in the step S607 and returns the process to the step S606. For example, when it is determined that a directory entry of the file 211 has not been created in the step S606, the CPU 105 creates a new directory entry 301 in the directory 210 in the recording medium 109 by the directory-entry creating process.

Figure 6:
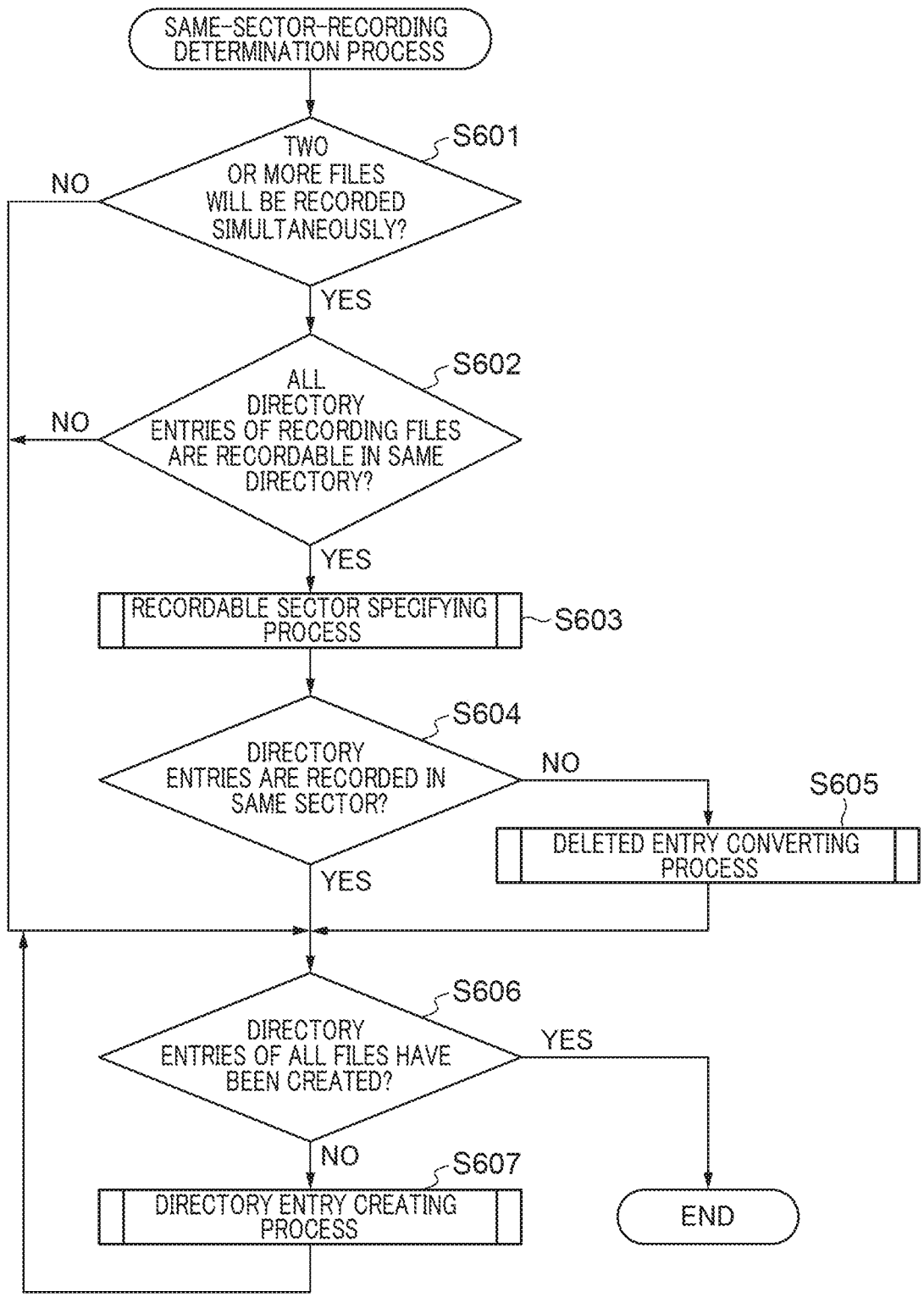
FIG. 6 is a flowchart showing procedures of a same-sector-recording determination process concerning the first embodiment.

As mentioned above, the description about the same-sector-recording determination process in FIG. 6 is finished.

Next, the directory-entry creating process in the step S607 in FIG. 6 will be described using a flowchart in FIG. 7. Hereinafter, a case where a directory entry of the file 211 is not created in the step S606 will be described.

The CPU 105 specifies the directory 210 in which the directory entry 301 will be newly created in step S701 on the basis of pass information about the file 211.

The CPU 105 determines whether the hint position information is valid in step S702 by referring the hint-position storage area 500 corresponding to the directory 210 specified in the step S701. That is, the CPU 105 determines whether the sector number other than "0" is recorded in the sector number storage area 501 of the hint-position storage area 500 corresponding to the directory 210. When it is determined that the hint position information is valid in the step S702, the process proceeds to the step S703. When it is determined that the hint position information is invalid in the step S702, the process proceeds to the step S704.

In the step S703, the CPU 105 sets the position from which the retrieval of a recordable directory entry is started (hereinafter referred to as a "retrieval start entry position") to the hint position stored in the hint-position storage area 500. After that, the process proceeds to step S705.

In the step S704, the CPU 105 sets the retrieval start entry position to the directory entry at the head of the head sector of the directory 210. After that, the process proceeds to step S705.

In the step S705, the CPU 105 determines whether the directory entry at the position where a currently recordable directory entry is retrieved (hereinafter referred to as a "retrieval entry position") is either a deleted entry or a vacant entry. When it is determines that the directory entry concerned is either a deleted entry or a vacant entry in the step S705, the process proceeds to the step S706. When it is determined that the directory entry concerned is neither a deleted entry nor a vacant entry in the step S705, the process proceeds to step S707.

In the step S706, the CPU 105 determines that the directory entry at the current retrieval entry position is a recordable directory entry and records metadata of a newly recording file in this directory entry. After that, this process is finished.

In the step S707, the CPU 105 sets the retrieval entry position to the next directory entry.

In step S708, the CPU 105 determines whether the retrieval entry position reaches the terminal of the sector. When it is determined that the retrieval entry position does not reach the terminal of the sector, the process proceeds to the step S705. When it is determined that the retrieval entry position reaches the terminal of the sector in the step S708, the process proceeds to the step S709.

The CPU 105 determines whether the retrieval entry position reaches the terminal of the cluster in the step S709. When it is determined that the retrieval entry position does not reach the terminal of the cluster in the step S709, the process proceeds to step S710. When it is determined that the retrieval entry position reaches the terminal of the cluster in the step S709, the process proceeds to step S711.

The CPU 105 sets the retrieval entry position to the directory entry in the head of the next sector in the step S710 and proceeds with the process to the step S705.

In the step S711, the CPU 105 determines whether there is a next cluster by referring to the FAT. When it is determined that there is no next cluster in the step S711 (namely, when the value showing the terminal is recorded in the FAT entry allocated to the current cluster), the process proceeds to step S712. When it is determined that there is a next cluster in the step S711, the process proceeds to step S713.

In the step S712, the CPU 105 secures an area of one cluster size in the data storage area 201 as a next cluster and writes "0" to all the secured area. After that, the process proceeds to the step S713. At this time, the CPU 105 changes the value of the FAT entry allocated to the current cluster to the cluster number allocated to the next cluster and record the value showing the terminal to the FAT entry allocated to the next cluster.

The CPU 105 sets the retrieval entry position to the directory entry of the head of the next cluster in the step S713 and proceeds with the process to the step S705.

Figure 7:
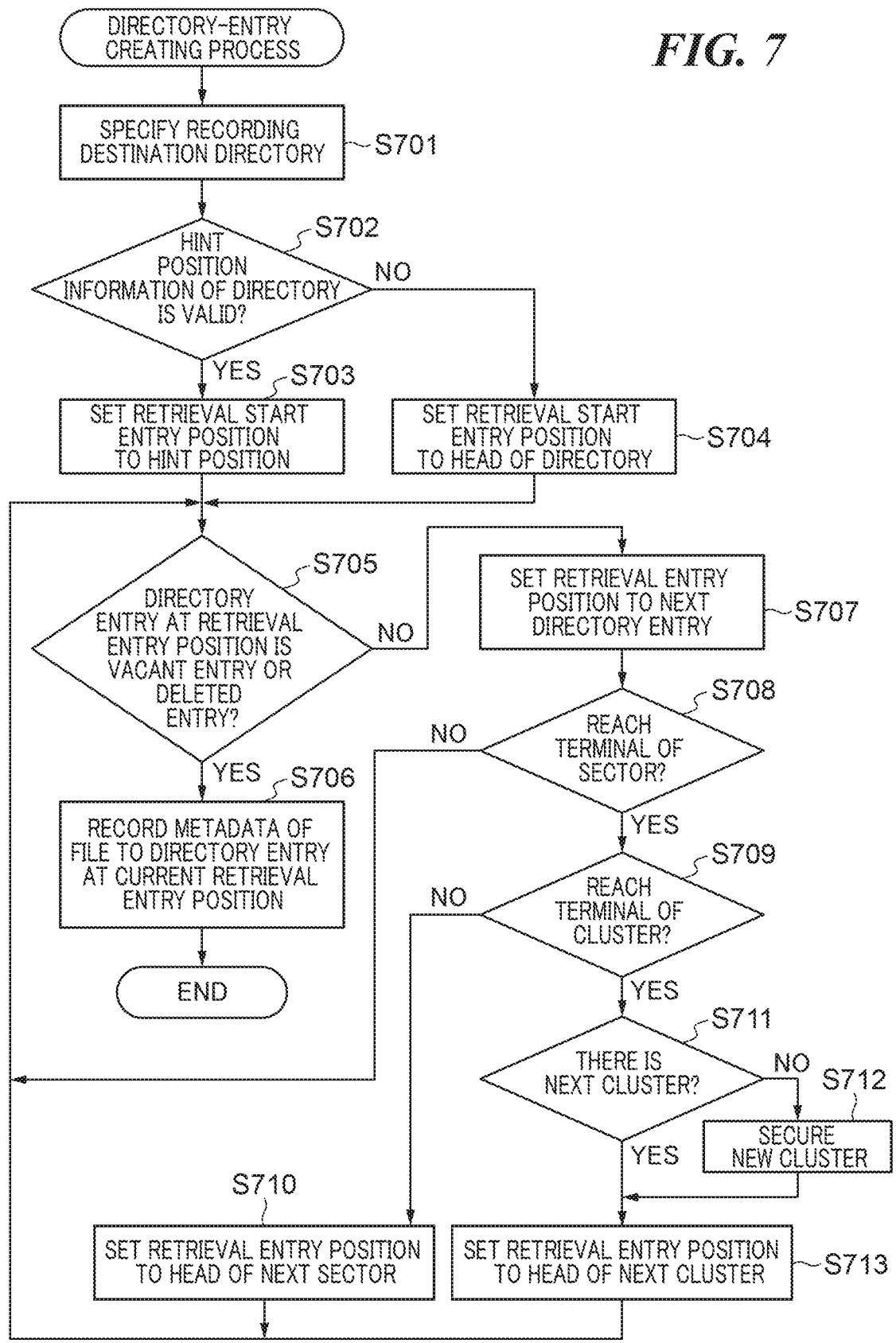
FIG. 7 is a flowchart showing procedures of a directory entry creating process in step S607 in FIG. 6.

The description about the directory-entry creating process in FIG. 7 has been completed.

Next, the recordable sector specifying process in the step S603 in FIG. 6 will be described using a flowchart in FIG. 8.

In step S801, the CPU 105 determines whether investigation of a sector including a vacant entry in the directory 210 is completed, i.e., determines whether a next investigation target sector is next to a sector including a vacant entry. When it is determined that the investigation of a sector including a vacant entry is completed (i.e., that a next investigation target sector is next to a sector including a vacant entry) in the step S801, this process is finished. In this case, there is no sector in which all the files that will be recorded are recordable among the recorded sectors. When it is determined that the investigation of a sector including a vacant entry is not completed in the step S801, the process proceeds to the step S802.

In the step S802, the CPU 105 initializes a counter that is used for counting the number of recordable directory entries to "0".

In step S803, the CPU 105 sets a position of a directory entry that becomes an investigation target (hereinafter referred to as an "investigation entry") in below-mentioned step S805 to the head of the sector.

In step S804, the CPU 105 determines whether the position of the investigation entry reaches the terminal of the sector. When it is determined that the position of the investigation entry reaches the terminal of the sector in the step S804, the process proceeds to step S808. When it is determined that the position of the investigation entry does not reach the terminal of the sector in the step S804, the process proceeds to the step S805.

In the step S805, the CPU 105 determines whether the investigation entry is either a deleted entry or a vacant entry. When it is determined that the investigation entry is either a deleted entry or a vacant entry in the step S805, the process proceeds to the step S806. When it is determined that the investigation entry is neither a deleted entry nor a vacant entry in the step S805, the process proceeds to step S807.

In the step S806, the CPU 105 increments the counter by one. The CPU 105 moves the investigation entry to the position of the next directory entry in the step S807 and returns the process to the step S804.

In the step S808, the CPU 105 determines whether the value of the counter is equal to or more than the number of files that will be recorded to the recording medium 109 simultaneously. When it is determined that the value of the counter is equal to or more than the number of files that will be recorded simultaneously in the step S808, the process proceeds to step S809. When it is determined that the value of the counter is less than the number of files that will be recorded simultaneously in the step S808, the process proceeds to step S810.

The CPU 105 saves the sector number of the sector of the current investigation target to the hint-position storage area 500 in the step S809 and finishes this process.

The CPU 105 sets the next sector as an investigation target in the step S810 and returns the process to the step S801. The description about the recordable sector specifying process in FIG. 8 has been completed.

As described above, when there is no sector in which all the directory entries of the files that will be recorded simultaneously are recordable (NO in the step S604) in the same-sector-recording determination process, the deleted-entry converting process is executed in the step S605. That is, a new sector that enables the directory entries of all the files to be recorded in the same directory is generated by executing the deleted-entry converting process. Accordingly, the directory entries of all the files that will be recorded are recordable from the head of the generated new sector.

The deleted-entry converting process in the step S605 in FIG. 6 will be described using a flowchart in FIG. 9.

In step S901, the CPU 105 sets the investigation entry to a directory entry at a head of a sector including a vacant entry.

In step S902, the CPU 105 determines whether the investigation entry is a vacant entry. When it is determined that the investigation entry is a vacant entry in the step S902, the process proceeds to step S904. When it is determined that the investigation entry is not a vacant entry in the step S902, the process proceeds to step S903.

The CPU 105 sets the position of the investigation entry to the next directory entry in the step S903 and returns the process to the step S902.

In the step S804, the CPU 105 determines whether the position of the investigation entry is the head of the sector. When it is determined that the position of the investigation entry is the head of the sector in the step S904, the process proceeds to the step S909. When it is determined that the position of the investigation entry is not the head of the sector in the step S904, the process proceeds to the step S905.

In step S905, the CPU 105 determines whether the position of the investigation entry reaches the terminal of the sector. When it is determined that the position of the investigation entry reaches the terminal of the sector in the step S905, the process proceeds to step S908. When it is determined that the position of the investigation entry does not reach the terminal of the sector in the step S905, the process proceeds to the step S906.

In the step S906, the CPU 105 records "0xE5" at the head of the investigation entry to convert a vacant entry into a deleted entry.

The CPU 105 sets the investigation entry to the next directory entry in the step S907 and proceeds with the process to the step S905.

In step S901, the CPU 105 sets the investigation entry to a directory entry at a head of a next sector.

The CPU 105 saves the sector number of the sector including the investigation entry to the sector number storage area 501 of the hint-position storage area 500 in the step S909, and finishes this process. The description about the deleted-entry converting process in FIG. 9 has been completed.

According to the above-mentioned embodiment, when a plurality of files are recorded simultaneously, only one sector is updated for recording directory entries of the files. As a result, only one page of the recording medium 109 is updated while recording the plurality of files simultaneously, which enables to reduce degradation of the writing speed of management information like a directory entry of the FAT file system.

Moreover, although a vacant entry that is a non-recording area is converted into a deleted entry in the step S906 in the deleted-entry converting process as mentioned above, a vacant entry may be converted into a directory entry different from a deleted entry as long as it is a reusable directory entry. A reusable directory entry can be converted into a new valid directory entry and enables retrieval of directory entries behind the converted valid directory entry.

Next, a second embodiment of the present invention will be described. In the second embodiment, a condition of recording to the same sector in the same directory is restricted as compared with the first embodiment. Thereby, only in a required and available case, directory entries can be stored in one sector.

Moreover, in the same-sector-recording determination process in the first embodiment, when not all directory entries of files that will be recorded simultaneously can be recorded in the same sector in the same directory, a new sector is created using the hint position stored in the hint-position storage area 500. After that, directory entries are created in the new sector. As compared with this, in the same-sector-recording determination process in the second embodiment, when not all directory entries of files that will be recorded simultaneously can be recorded in the same sector in the same directory, a directory entry that is certainly recordable from a head of a directory is retrieved. Thereby, a directory can be used more efficiently.

Since the hardware configuration in the second embodiment is the same as that in the first embodiment, the same reference numerals are applied to the same components and duplicated descriptions are omitted. Moreover, a file of actual data in the recording medium 109 is managed with the FAT file system as with the first embodiment. Accordingly, the directory-entry creating process (FIG. 7), the deleted-entry converting process (FIG. 9), and the hint-position storage area 500 in the first embodiment are executed and used as-is in the second embodiment.

Figure 10:
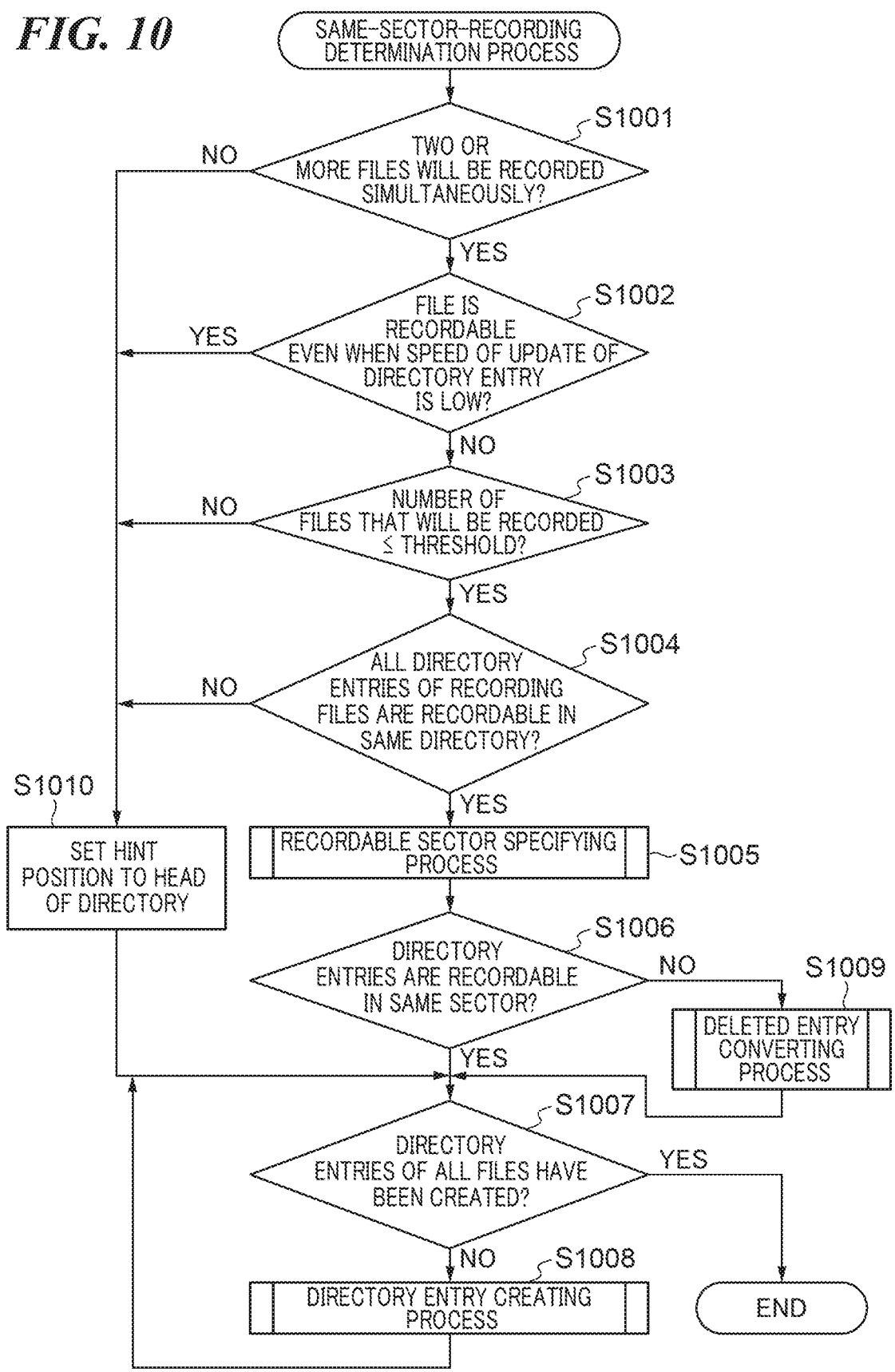
FIG. 10 is a flowchart showing procedures of a same-sector-recording determination process concerning a second embodiment.

A same-sector-recording determination process in the second embodiment will be described using a flowchart in FIG. 10.

The CPU 105 determines whether two or more files will be recorded simultaneously in step S1001. When it is determined that one file will be recorded in the step S1001, the process proceeds to step S1010. When it is determined that two or more files will be recorded simultaneously in the step S1001, the process proceeds to step S1002.

The CPU 105 sets the hint position stored in the hint-position storage area 500 to a head of a directory of a recording destination in the step S1010 and proceeds with the process to step S1007.

In the step S1002, the CPU 105 determines whether a current photographing mode allows the recording of a file to continue even when an update speed (a bit rate) of directory entries is lower than a predetermined speed. That is, the CPU 105 determines whether the writing speed of the management information does not have an influence on the recording of a file in the current photographing mode. When it is determined that the current photographing mode allows the recording of a file to continue even if the update speed is low, the process proceeds to the step S1010. That is, even when a file that will be created includes a moving image during photographing as actual data, when the photographing is performed in a photographing mode that finishes the photographing in a short period, or when the photographing is performed in a photographing mode in which the bit rate is low but photographing time is long, the process proceeds to the step S1010. When it is determined that the current photographing mode does not allow the recording to continue in low-speed update of the directory entry during recording in the step S1002, the process proceeds to the step S1003.

In the step S1003, the CPU 105 determines whether the number of files that will be recorded simultaneously is equal to or less than a threshold that is beforehand kept in the ROM 106. The threshold that is beforehand kept in the ROM 106 is the number of the maximum directory entries recordable in one sector, and is "16" in the FAT file system. It is impossible to store the directory entries more than the threshold in one sector because of the standard specification of the FAT file system. Accordingly, when it is determined that the number of files that will be recorded simultaneously is equal to or less than the threshold in the step S1003, the process proceeds to step S1004. When it is determined that the number of files that will be recorded simultaneously is more than the threshold in the step S1003, the process proceeds to step S1010.

In the step S1004, the CPU 105 determines whether all the directory entries of the files that will be recorded simultaneously are recordable in the same directory (hereinafter referred to as the directory 210). When it is determined that at least one directory entry of the directory entries of the files that will be recorded simultaneously is recorded in a directory that is different from the directory 210 in the step S1004, the process proceeds to the step S1010. When it is determined that all the directory entries of the files that will be recorded simultaneously are recordable in the same directory 210, the process proceeds to the step S1005.

In the step S1005, the recordable sector specifying process (FIG. 8) described in the first embodiment is executed.

The CPU 105 determines whether the sector has been specified by the recordable sector specifying process in step S1006. That is, the CPU 105 determines whether all the directory entries of the files that will be recorded simultaneously are recordable in the same sector. When it is determined that the sector has been specified in the step S1006, the process proceeds to the step S1007. When it is determined that a sector cannot be specified in the step S1006, the process proceeds to step S1009.

The deleted-entry converting process (FIG. 9) described in the first embodiment is executed in the step S1009, and the process proceeds to the step S1007.

The CPU 105 determines whether the directory entries of all the files have been created in the step S1007. When it is determined that the directory entries of all the files have been created in the step S1007, this process is finished. When it is determined that there is at least one file of which directory entry is not created in the step S1007, the process proceeds to step S1008.

The directory-entry creating process (FIG. 7) described in the first embodiment is executed to create a directory entry in the step S1008, and the process returns to the step S1007. The description about the same-sector-recording determination process in the second embodiment in FIG. 10 has been completed. Thereby, only in a required and available case, the directory entries can be stored in one sector according to this embodiment.

Moreover, a deleted entry converted from a vacant entry by the deleted-entry converting process can be preferentially used as a directory entry of a file that is determined unnecessary to be recorded in the same sector by the same-sector-recording determination process. That is, a directory is used more efficiently.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-210647, filed Nov. 8, 2018, which is hereby incorporated by reference herein in its entirety.

What is claimed is:

1. A recording apparatus comprising:
at least one memory and at least one processor that function as:
a recording unit configured to record a file in a recording medium, wherein the recording medium consists of blocks each of which includes a plurality of pages, allows to write data in a page unit, allows to erase data in a block unit, and allows to access a page corresponding to a sector designated by a sector number; and
a controller configured to control so as to record a directory entry of a file in a designated sector in the recording medium,
wherein when a plurality of files will be recorded, the controller controls so that directory entries of the plurality of files will be recorded in a same sector.

2. The recording apparatus according to claim 1, wherein when only a part of the directory entries of the plurality of files is recordable in a target sector in which the directory entries should be recorded, the controller controls to record the directory entries of the plurality of files in a sector in which the directory entries should be recorded next to the target sector.

3. The recording apparatus according to claim 1, wherein the controller comprises a converting unit configured to convert a vacant entry in a target sector into a deleted entry when only a part of the directory entries of the plurality of files is recordable in the target sector that should record.

4. The recording apparatus according to claim 3, wherein the controller controls so as to record the directory entries of the plurality of files in a same sector, when recording the plurality of files in a same directory.

5. The recording apparatus according to claim 3, wherein the recording unit records a series of moving images captured with an image pickup unit as a plurality of files, and
wherein the controller switches whether a process by the converting unit is executed according to one of a bit rate of the moving images and a mode of the moving images.

6. The recording apparatus according to claim 3, wherein the controller controls to record the directory entries of the plurality of files in a sector in which the directory entries should be recorded next to the target sector after executing the process by the converting unit.

7. The recording apparatus according to claim 3, further comprising a storage area that stores a sector number of a sector from which retrieval of a recordable directory entry is started and an offset from a head of the sector from which the retrieval of a recordable directory entry is started as a hint position.

8. The recording apparatus according to claim 7, wherein when the number of the plurality of files is more than a threshold, the converting unit starts the retrieval of a recordable directory entry by setting the hint position to the head of the sector that should record.

9. The recording apparatus according to claim 7, wherein when a writing speed of the directory entry does not have an influence on the recording of the plurality of files, the converting unit sets the hint position to the head of the sector that should record and starts the retrieval of a recordable directory entry.

10. A control method for a recording apparatus comprising a memory storing a program and a processor executing the program to perform the control method, the control method comprising:
a recording step of recording a file in a recording medium; and
a control step of controlling so as to record a directory entry of a file in a designated sector in the recording medium,
wherein the recording medium consists of blocks each of which includes a plurality of pages, allows to write data in a page unit, allows to erase data in a block unit, and allows to access a page corresponding to a sector designated by a sector number, and
wherein when a plurality of files will be recorded, it is controlled so that directory entries of the plurality of files will be recorded in a same sector in the control step.

11. A non-transitory computer-readable storage medium storing a control program causing a computer to execute a control method for a recording apparatus comprising a memory storing a program and a processor executing the program to perform the control method, the control method comprising:
a recording step of recording a file in a recording medium; and
a control step of controlling so as to record a directory entry of a file in a designated sector in the recording medium,
wherein the recording medium consists of blocks each of which includes a plurality of pages, allows to write data in a page unit, allows to erase data in a block unit, and allows to access a page corresponding to a sector designated by a sector number, and
wherein when a plurality of files will be recorded, it is controlled so that directory entries of the plurality of files will be recorded in a same sector in the control step.

* * * * *